United States Patent [19]

Osborn

[11] 3,945,873

[45] Mar. 23, 1976

[54] PROCESS FOR BONDING NON-WOVEN FIBROUS SHEETS AND ARTICLES MADE THEREFROM

[75] Inventor: Robert O. Osborn, Richmond, Va.

[73] Assignee: E. I. Du Pont de Nemours & Company, Wilmington, Del.

[22] Filed: May 3, 1974

[21] Appl. No.: 466,843

[52] U.S. Cl. ............... 156/271; 118/300; 118/506; 138/141; 156/244; 156/291; 156/324; 428/36; 428/157; 428/171
[51] Int. Cl.² .................... B32B 31/20; B32B 31/12
[58] Field of Search ........... 156/290, 291, 271, 244, 156/324; 118/300, 506; 428/36, 157, 171; 138/141

[56] References Cited
UNITED STATES PATENTS 3,269,278  8/1966  Olstad ............................... 156/271
3,271,223  9/1966  Sudo .................................. 156/244

Primary Examiner—Edward G. Whitby

[57] ABSTRACT

A process for bonding a first sheet of non-woven plexifilamentary polymeric material to a second sheet of compatible, thermoplastic, polymeric material by applying at least one stream of hot polymeric material to the second sheet of polymeric material to form a narrow continuous bead and after a time sufficient to allow the hot polymeric material of the bead to begin to fuse the first sheet of plexifilamentary polymeric material, simultaneously cooling and deforming the bead so that it permeates the first sheet of plexifilamentary polymeric material and so that its edges extend beyond the region where the polymer has permeated the first sheet of plexifilamentary polymeric material. The hot-melt polymer bonds the two sheets together in the region where it permeates the plexifilamentary material, and forms a continuous bond between the superposed layers. The structure may then be slit through the bead to form a porous tube which is particularly useful as an irrigation tubing.

14 Claims, 5 Drawing Figures

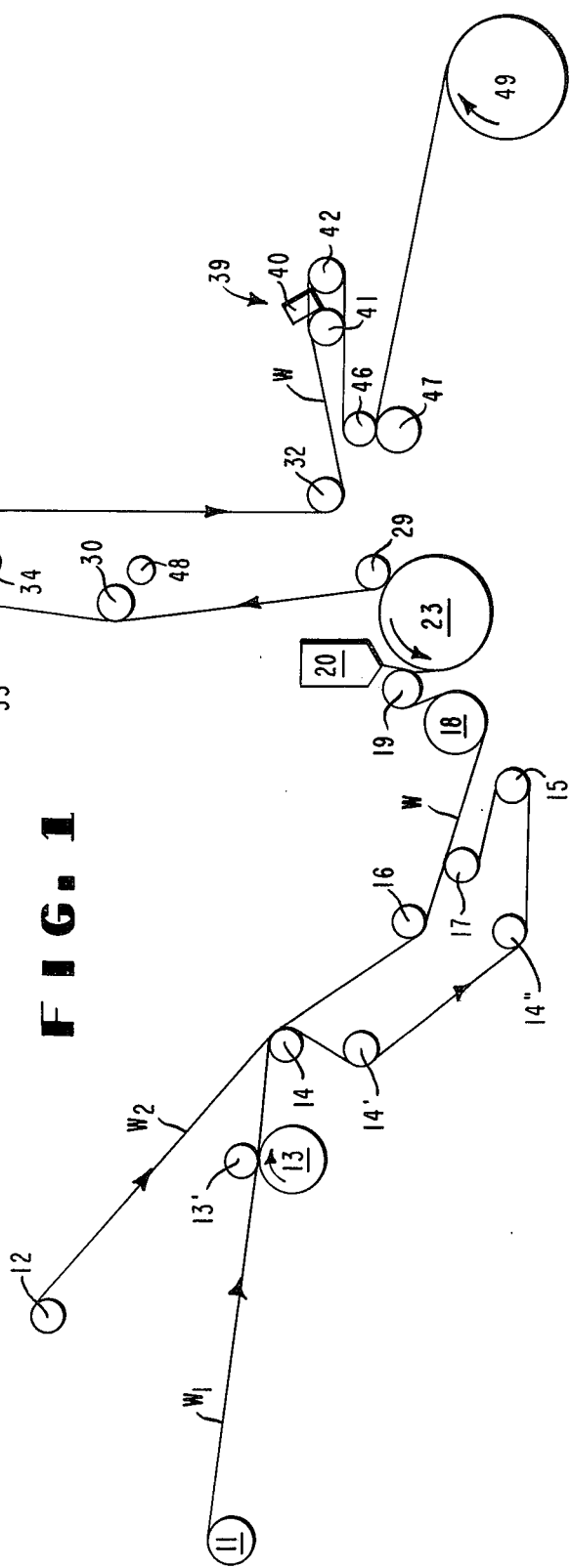
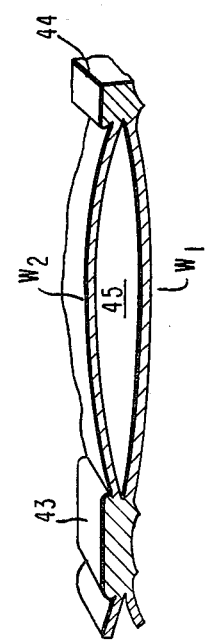
FIG. 1
FIG. 5

PROCESS FOR BONDING NON-WOVEN FIBROUS SHEETS AND ARTICLES MADE THEREFROM

BACKGROUND OF THE INVENTION

1. Field of the Invention

This invention relates to an improved process for bonding polymeric sheet materials together, and particularly to a process for bonding a sheet of plexifilamentary polymeric material to a second sheet of polymeric material. The process is useful in the fabrication of porous plexifilamentary tubing which can be used for agricultural purposes, such as irrigation.

2. Description of the Prior Art

Processes for forming tubing from heat-sealable materials are known in the art. U.S. Pat. No. 2,522,346 discloses the manufacture of tubing from rolls of material in which two plies of heat-sealable film are separated by a liner of non-heat sealable cellulosic material. Wide rolls of the heat-sealable film are first sliced and then brought into contact with a heated plate or open flame. The heating of the ends of the rolls causes contacting edges of the heat-sealable film to become united, and the linear material prevents the union of those portions of the film separated by the liner. In this manner, tubing of any desired width may be prepared.

U.S. Pat. No. 2,916,053 discloses a process for forming tubing from superposed layers of thermoplastic sheet material using a sealing heat internally equipped with a conventional resistance type electric heating element.

U.S. Pat. No. 3,538,912 discloses a method of bonding layers of porous and liquid absorbent non-woven cellulosic material using an intermediate layer of thermoplastic material. This process requires interleaving the thermoplastic material between the superposed non-woven sheets. The bonds formed, however, are of marginal strength.

British Pat. No. 993,092 discloses a process for bonding two thermoplastic films together by applying a strip of hot thermoplastic material to one film and allowing the heat of the applied material to fuse the two sheets together. This patent, however, does not deal with a process for making tubing nor does it deal with the problem of bonding two layers of material together when one of those layers is a plexifilamentary sheet.

The problems encountered in bonding a sheet of fibrous, non-woven plexifilamentary polymeric materials either to another sheet of the same material or to a sheet of a second polymeric material are entirely different from those encountered in bonding two solid thermoplastic films together. As with all fibrous materials, the plexifilaments in such a sheet structure react to the heat used in the sealing process and "neck down" to such an extent that the mere act of applying heat to the sheets, for the purpose of effectuating a bond between the two layers of material, actually creates a rupture line at the edge of the heat seal.

The situation is even more complicated when the process is used to produce a tube which can be used in trickle irrigation. While a small hole, which tends to plug quickley with water sediments, can be tolerated in such a tube, a hole with a rupture line around it, which will increase in size due to the pressure exerted on the weakened fibers in the region of the hole, cannot be tolerated. Such a hole, even a microscopic hole which allows an almost invisible squirt of water to escape, can leak an order of magnitude more water than intended for each plant and thereby reduce proportionally the amount of water provided to plants downstream from the hole. Furthermore, for outdoor use, the bond formed should, preferably, be resistant to ultraviolet degradation and the tubing formed should be resistant to the formation of kinks. Furthermore, because of its inert nature and relative cheapness, polyethylene is a preferred material for irrigation tubing. Plexifilamentary polyethylene sheets are particularly difficult to bond together or to bond to solid polyethylene sheets.

SUMMARY OF THE INVENTION

According to the present invention, there is provided a process for bonding a first layer of fibrous, nonwoven plexifilamentary, polymeric sheet material to a second layer of compatible, thermoplastic, polymeric sheet material comprising the steps of:

a. Superposing, in overlapping contact with one another, the first and second layers of polymeric sheet materials to form a composite sheet;

b. applying at least one stream of hot polymeric material onto the surface of the second layer of polymeric sheet material to form a narrow, continuous bead of hot polymeric material; and c. after a time sufficient to allow the hot polymeric material of the bead to begin to fuse the first layer of plexifilamentary polymeric sheet material, cooling the bead by contacting it with a solid surface maintained at a temperature below the solidification temperature of the polymeric material in the bead, and simultaneously, deforming the bead by pressing the upper surface of the bead against the solid surface with a force sufficient to cause the hot polymeric material of the bead to permeate the first layer of plexifilamentary, polymeric sheet material and to cause the edges of the bead to extend beyond the region where the polymeric material of the bead has permeated the first layer of plexifilamentary polymeric sheet material.

The process is applicable to the situation where both the first and second sheets of material are fibrous, non-woven plexifilamentary polymeric sheets. The process is also useful in the situation where only the first sheet is a fibrous, non-woven plexifilamentary sheet, and the second sheet is a solid film of material, such as black pigmented branched polyethylene. In the latter situation, however, the solid film must be a thermoplastic material (i.e., not cross-linked or thermoset) and it should be compatible, in the fluid state, with the plexifilamentary polymeric material of the first layer. Preferably, it should also have a relatively low degree of orientation compared to the material of the first layer. In either situation, then, the second layer must be a layer of a compatible thermoplastic polymeric material.

The first and second layes of the polymeric material may be formed from a single sheet, folded over on itself, or they may be separate sheets of polymeric material in which case the step of superposing the first and second layers of polymeric material is accomplished by superposing separate sheets of polymeric material.

The process is particularly useful when the first and second layers of polymeric material are made from polyethylene. In this case, the bead is also a polyethylene, preferably a branched polyethylene, and the step of extruding at least one narrow continuous bead of hot-melt polymer comprises heating the hot-melt polymer to a temperature between about 260° and about 340°C. (preferably 320° to 340°C.).

It is advantageous to use an excess of polymer in the bead, so, in the preferred embodiment, the bead of polymeric material comprises at least 35 mg/cm. (preferably 50 mg/cm.) of polymeric material in a ribbon less than about 0.8 cm. wide. Best results have also been achieved when the basis weight of the plexifilamentary polymeric material is at least 1.2 oz. per sq. yd., preferably 1.5 oz. per sq. yd. Furthermore, when the products formed by the above process are to be used in direct sunlight, it is advantageous to include in the polymeric material from which the bead is formed a small amount (i.e., less than about 1%) of a suitable ultraviolet absorber such as carbon black, to prevent degradation of the bond by the sunlight.

When the process is used to make tubing, the step of applying at least one stream of hot polymeric material, comprises applying a plurality of parallel streams of polymeric material, and the process further comprises the step of slitting the composite sheet (possibly along the longitudinal axis of each bead) to form a plurality of tubes. Preferably the beads should be separated from one another by at least about 0.5 inch, but much larger or even narrower spacings are useful in some circumstances.

The tube formed from the above process comprises:

a. a first layer of fibrous, non-woven plexifilamentary polymeric sheet material;

b. a second layer of compatible, thermoplastic, polymeric sheet material;

c. at least one narrow continuous bead of polymeric material deposited on the second layer of polymeric sheet material and permeating the first layer of plexifilamentary polymeric sheet material to form a bond between the first and second layers of polymeric sheet material. The bead extends in the longitudinal direction along at least one edge of the tube, and the edges of the upper surface of the bead are deformed to extend beyond the region where the polymer of the bead has permeated the first layer of plexifilamentary sheet material and bonded the two layers of polymeric material together.

The two layers can be formed from the same sheet, or they can be formed from two separate sheets. In one embodiment of the tube, the second sheet of polymeric material is a film of black branched polyethylene, and in a second embodiment, the second sheet of polymeric material is a sheet of fibrous, non-woven plexifilamentary polymeric material similar to that used as the first sheet.

If the tube is formed from a single sheet, folded back upon itself, only one bead need be used. On the other hand, if the tube is made from two sheets of material, then at least two parallel beads of material are used to form the tube. In the preferred embodiment, the plexifilamentary polymeric material has a basis weight of at least 1.2 oz. per sq. yd., and the bead comprises at least 35 mg/cm. (preferably 50 mg/cm.) in a ribbon less than about 0.8 cm. wide of polymeric material. If a number of tubes are formed at the same time, by applying a plurality of streams of hot polymeric material, and then slitting each bead, the resultant bead associated with each edge of the tube will contain at least about 15 mg/cm. (preferably at least 25 mg/cm.) of polymeric material in a ribbon less than about 0.4 cm. wide.

BRIEF DESCRIPTION OF THE DRAWINGS

The present invention is best described by reference to the following figures in which:

FIG. 1 is a diagram of one embodiment of an apparatus for practicing the process of the present invention and making a plurality of tubes from two sheets of material;

FIG. 5 is a perspective view of a portion of a tube formed by the apparatus shown in FIG. 1, taken in cross-section.

DESCRIPTION OF THE PREFERRED EMBODIMENT

Figure 2:
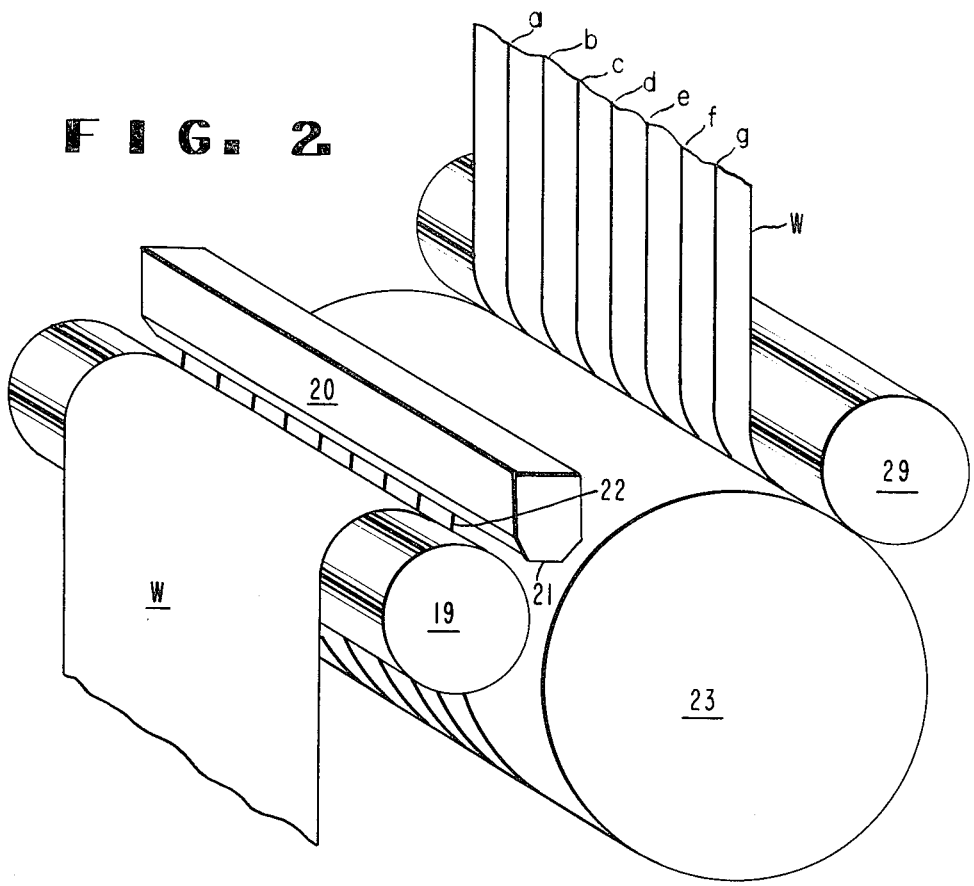
FIG. 2 is an enlarged perspective view of the sealing region shown in FIG. 1.

The invention is described with reference to the apparatus for practicing the process of the invention shown in the attached drawings.

In FIG. 1, two separate sheets of polymeric sheet material ($W_1$ and $W_2$) are provided from supply rolls 11 and 12. The bottom web $W_1$ will be referred to as the first sheet of polymeric material, and the top web will be referred to as the second sheet of polymeric material. Both the first and second sheets of polymeric material may be fibrous, non-woven, plexifilamentary, polymeric sheet materials, and the invention will be described by reference to a process in which both sheets are such materials. However, it is to be understood that the second sheet of polymeric material $W_2$ may be in the form of a solid film.

The preferred plexifilamentary polymeric sheets used in the present invention are the fluid-permeable flexible, porous, non-woven fibrous sheets disclosed by Steuber in U.S. Pat. No. 3,169,899 and by David in U.S. Pat. No. 3,442,740, the disclosures of which are hereby incorporated by reference into the present specification. These patents describe a method of making and finishing flexible porous non-woven fibrous sheets from special plexifilamentary strands which are described in Blades et al, U.S. Pat. No. 3,081,519, the disclosure of which is also incorporated by reference into the present specification. Porous, non-woven plexifilamentary sheets used to make the articles of this invention are preferably made from strands of a polyolefin such as polyethylene or polypropylene, as taught in the aforementioned patents.

After passing through a pair of break rolls 13 and 13' (used to provide tension in the nip), guide rolls 14, 14' and 14" and dancer roll 15, which in combination are used to control the tension in sheet $W_1$, sheet $W_1$ is superposed with sheet $W_2$ by guide rolls 16 and 17 to form composite sheet W. Composite sheet W is then fed to idler roll 18 and extrusion roll 19.

Figure 3:
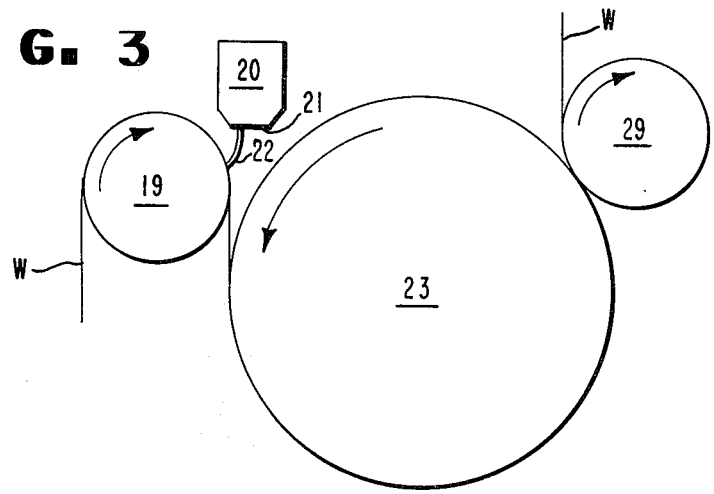
FIG. 3 is a cross-sectional view of the sealing region shown in FIG. 1.

As shown most clearly in FIGS. 2 and 3, extrusion roll 19 is disposed beneath an extrusion die 20 which serves to supply molten polymeric material to the die or orifice plate. The molten nature of the polymer in die 20 may be maintained by heating coils (not shown) or any convenient method well known to those skilled in the art of polymer extrusion. At the bottom of die 20, is an extrusion die orifice plate 21 which contains a plurality of extrusion orifices. The size and construction of these orifices will vary, depending upon the materials used. Such a plate can easily be constructed by one skilled in the art of polymer extrusion. In one suitable embodiment, however, the orifices in the plate have a diameter of approximately 3/16 inch, and their centers are offset from one another by 13/16 inch. In this embodiment, the tubes will be made by slitting the beads formed in the process down their middle. In another embodiment, the die orifices can have alternate 13/16 inch and ⅜ inch centers, and the tubes can be made by slitting the composite sheet between the beads separated from one another by ⅜ inch. The orifice spacing, however, can be adjusted to make tubes with any desired width.

The hot polymeric material used in the present invention to form the beads can be any suitable hot-melt or thermoplastic polymeric material. However, the hot polymeric material will preferably be selected from a group of polymers which are the same or similar to the polymer from which the plexifilamentary material is made. For example, to bond together two non-woven sheets made from polyethylene plexifilaments, it is preferred to use as a hot-melt composition a polyethylene of low crystallinity. Examples of suitable hot-melt compositions include branched polyethylene with a melt index of 12, a copolymer of 97.5% ethylene and 2.5% vinyl acetate with a melt index of 5.0, and a copolymer of 82% ethylene and 18% vinyl acetate with a melt index of 8.0. One suitable hot-melt composition is Alaton* 1560 polyethylene resin, which can be used for sealing at a temperature of between about 260° and 340°C. Preferably, however, it is used at a temperature of between about 320° and 340°C.

*Registered trademark of E. I. du Pont de Nemours and Co.

The hot polymeric material used to form the beads can also contain a small amount of ultraviolet absorber as disclosed above.

A plurality of polymer streams 22 are caused to issue from die plate 21. This can be simply by using the force of gravity or by supplying some pumping force, if necessary. In the embodiment illustrated, the hot polymer streams are extruded but actually they can be applied by any convenient method of applying a continuous stream of hot polymeric material. These polymer streams are applied to the exposed surface of sheet W as it passes over extrusion roll 19, or more specifically, they are applied to the exposed surface of sheet $W_2$. As they impinge on sheet $W_2$, they form a plurality of narrow continuous beads of hot polymeric material running parallel to one another along the longitudinal extent of sheet W.

After the beads of hot polymeric material have been laid down on the upper surface of the composite sheet, the composite sheet is removed from extrusion roll 19 and moves a short distance to a chill roll 23, which is normally a driven roll. In the space between extrusion roll 19 and chill roll 23, the composite sheet is unsupported, although it is maintained under tension to keep it taut, and time is allowed for the hot polymer of the bead to fuse (i.e., melt) the composite sheet, particularly sheet $W_1$.

Prior to contacting the chill roll, there is little or no permeation of sheet $W_1$ by the hot polymer of the bead. The bond, itself, is caused by the material forced through sheet $W_1$ by the chill roll. The strength of the bond and the frequency of the holes which form at the edge of the bond will depend to a large extent on the amount of fusion which is allowed to take place in sheet $W_1$ before the upper surface of the bead is pressed against the chill roll. The actual distance that the sheet travels unsupported, however, will depend on a variety of factors, including the speed with which the sheets are moving, the temperature of the hot polymeric material in the streams when they impinge on composite sheet, the basis weight of the sheets, and the composition of the sheets. When both sheets $W_1$ and $W_2$ are made from plexifilamentary sheets with a basis weight between 1.2 and 2.2 oz./sq. yd., the composite sheet is moving at a linear speed of 30 ft./min., and the reservoir temperature of the polymeric material in the die is about 332°C., then a gap of about 2 inches, between extrusion roll 19 and chill roll 23 appears to be sufficient.

Chill roll 23, which is maintained at a temperature below the solidification temperature of the polymeric material in the beads by some suitable means, such as water cooling, provides a solid surface which both cools and deforms the bead. The temperature of chill roll 23 can vary considerably, depending on its diameter, but with the conditions set forth above, a chill roll having about an eleven inch diameter, maintained at a temperature of about 24°C. will suffice.

Extrusion roll 19 may be a hard surfaced polished metal roll or a resilient surfaced roll. In fact, the polymer streams may be applied directly to the unsupported sheet. However, the chill roll should be a hard surfaced polished roll and, for best results, it should be displaced from the point at which the polymer streams impinge on the composite sheet so that the beads formed by such streams will have a chance to begin to fuse the composite sheet, particularly sheet $W_1$, before coming into contact with the chill roll.

The chill roll serves three purposes. In the first place, it causes the hot polymeric material of the bead, and also some of the material from sheet $W_2$, to permeate sheet $W_1$. In the second place, it cools at least the exterior of the bead, so that permeation of the polymeric material through sheet $W_1$ is eventually stopped. Permeation of the composite sheet continues after the composite sheet is in contact with the chill roll, but within a short period, the extend of the polymeric material's permeation of sheet $W_1$ can be seen to stop. This surface cooling also allows the composite sheet to be removed from the chill roll without sticking.

In the third place, the chill roll acts to deform the upper surface of the bead. The tension of the composite web is maintained at a level so that the force exerted on the upper surface of the bead by the chill roll is sufficient to flatten the bead and force the edges of the bead to extend beyond the region where the polymeric material of the bead has permeated sheet $W_1$. This situation can be seen in FIG. 4 where the flattened upper portion of bead 24 is shown with bulging edges 25 and 26 extending beyond the region where permeation has occurred. Without such deformation of the bead, beyond the region where the polymeric material permeates the first sheet, there will be a rupture line, full of small holes, along the edge of the bead.

Figure 4:
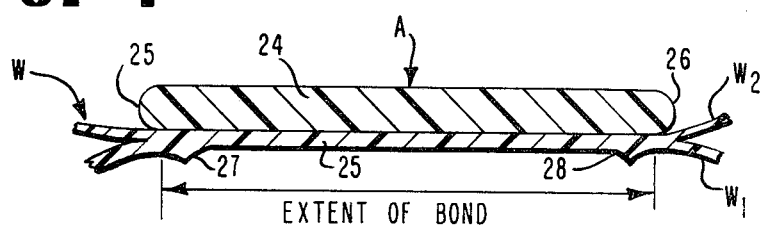
FIG. 4 is a cross-sectional view of the seal formed by the process performed by the apparatus shown in FIG. 1.

FIG. 4 is a schematic illustration. Actually, the upper portion of the bead which will be referred to as the seal cap and the fused region of sheets $W_1$ and $W_2$ merge with one another and to a large extent are indistinguishable visually even though they have been distinguished in the figure for illustrative purposes. The one deviation from this occurs at the bottom surface of the fused portion of the composite sheet, particularly in spurs 27 and 28 where a considerable amount of sintered plexifilamentary material from sheet $W_1$ is to be found.

In the above discussion, and throughout the remainder of the specification, we shall, for convenience, refer to the top of the seal cap as the upper surface of the bead, even though the composite sheet may well be oriented in any direction.

In the embodiment described above, a force of 10 lbs. across a sheet two feet wide appears to be sufficient to cause the bulging of the edges of the seal cap which appears to be necessary to avoid the problems referred to above, where hot polymer permeating sheet $W_1$ will cause the fibers in this sheet to neck down to such an extent that a rupture line is formed along the edge of polymer bead. The amount of tension in the sheets, however, or actually the force with which the solid surface of the chill roll presses against the upper surface of the bead, can be varied considerably, depending on circumstances. The choice of the proper force to use is well within the skill of one skilled in the art, however, once taught the necessity for deforming the seal cap.

After the bead has been cooled sufficiently so that its geometry is substantially fixed, the composite web W is stripped off chill roll 23 using nip roll 29. Nip roll 29 serves two purposes. It serves to flatten spurs 27 and 28, but, more importantly, it serves to remove the composite sheet from the chill roll in a gradual bend so that minimal stresses are set up in the polymer bead which may still be hot enough at this point to flow.

After leaving nip roll 29, the composite sheet passes over guide rolls 30, 31 and 32 and through a cooling region represented by cooling nozzles 33 to 38, which in the embodiment illustrated are air nozzles. Guide roll 30 is cooled by air jet 48. Care must be taken, however, not to use air pressure high enough to rupture the seal which may still be weak until the polymer bead is fully cooled.

From guide roll 32, the composite sheet W is passed to a slitting station 39. In the embodiment shown, the slitting station is illustrated as a plurality of knife blades 40 located between guide rolls 41 and 42, but any conventional slitting mechanism can be used. Prior to entering the slitting station 39, composite sheet W is an integral sheet formed from two separate sheets, which are bonded together in a plurality of regions by a plurality of polymer beads (a) through (g). The slitting step serves to slit this integral sheet into a plurality of tubes by slitting each bead along its longitudinal axis, indicated by A in FIG. 4. As stated above, however, the slit can be made either between alternate beads or down the middle of each bead.

A representative tube is illustrated in FIG. 5. It consists of an upper sheet $W_2$, a lower sheet $W_1$, and two bonds. Bond 44, on the right side, has been illustrated as a "half bead" formed when the composite sheet is slit down a bead, and bond 43, on the left side, has been illustrated as a full bead, formed when the composite sheet is slit between alternate beads. The bonds hold the two sheets together at the edges of the tube and provide a hollow region 45 between the sheets suitable for fluid flow.

The individual tubes are then passed over nip rolls 46, 47, which are driven at a speed which is a constant percentage of the speed of the chill roll, (to isolate the slitting station from the wind-up station), and are wound up on wind up roll 49, which in the embodiment illustrated is a driven roll.

EXAMPLE 1

Using the apparatus shown in FIGS. 1 through 3 above, irrigation tubing suitable for use in above-ground irrigation was produced with a first sheet of 2.2 oz./sq. yd., non-woven, plexifilamentary polymeric material and a second sheet of 5.5 mil black polyethylene. The non-woven plexifilamentary polymeric material was made according to the teaching in David, U.S. Pat. No. 3,442,740, particularly Example 10. A plurality of narrow beads of Alathon 1560 polyethylene, kept at a temperature of 327°C., were applied to the black polyethylene side of the composite sheet. The apparatus was operated at 25 feet per minute with a chill roll temperature of 24°C. A plurality of beads (55 mg./cm.) were laid down, cooled and deformed as set forth above. The orifices in the extrusion plates were alternately spaced 13/16 inch and ⅜ inch apart and the tubes were formed by slitting the composite structure down the middle of the ⅜ inch section of composite web. Application of the Alathon to the plexifilamentary side of the composite sheet did not produce a reliable bond.

EXAMPLE 2

Following the procedure set forth in Example 1, a second tube of acceptable quality, suitable for sub-surface irrigation, was made using first and second sheets of plexifilamentary material. Both sheets were made according to the teaching in David, U.S. Pat. No. 3,442,740, particularly Example 10, except that the belt feed was adjusted so that the first sheet of plexifilamentary material had a basis weight of 2.2 oz./sq. yd., and the second sheet of plexifilamentary material had a basis weight of 1.6 oz./sq. yd. The seal weighed about 50 mg/cm., the sealing speed was 28 fpm; and the resin temperature was 335°C.

EXAMPLE 3

A third tube of acceptable quality, suitable for above-ground irrigation, was made using 5.5 mil black polyethylene film as the second sheet and a plexifilamentary material having a basis weight of 1.6 oz./sq. yd. as the first sheet. The plexifilamentary material was the same 1.6 oz/sq. yd. material used in Example 2, and the sealing conditions were the same as for Example 2.

The above description and examples of the process and articles of this invention are intended to be illustrative and not limiting, except as set forth in the appended claims.

What is claimed is:

1. A process for bonding a first layer of fibrous, non-woven, polymeric sheet material to a second layer of compatible, thermoplastic, polymeric sheet material comprising the steps of:
    a. superposing, in overlapping contact with one another, said first and second layers of polymeric sheet material to form a composite sheet;
    b. applying at least one stream of hot polymeric material onto the surface of said second layer of polymeric sheet material to form a narrow continuous bead of hot polymeric material; and
    c. after a time sufficient to allow the hot polymeric material of said bead to begin to fuse said first layer of non-woven polymeric sheet material, cooling said bead by contacting it with a smooth solid surface, maintained at a temperature below the solidification temperature of the polymeric material in said bead, and simultaneously deforming said bead, by pressing said solid surface against the upper surface of said bead with a force sufficient to cause the hot polymeric material of said bead to permeate said first layer of non-woven polymeric sheet material and to cause the edges of said bead to extend beyond the region where the polymeric material of the bead has permeated said first layer of non-woven polymeric sheet material.

2. The process of claim 1 wherein, during at least a portion of the time when the hot-melt polymer of said bead is fusing said first layer of non-woven polymeric sheet material, said composite sheet is maintained in a taut, unsupported condition.

3. The process of claim 2 wherein said first and second layers of polymeric material are separate sheets of polymeric material, and wherein the step of superposing said first and second layers of polymeric material is accomplished by superposing the separate sheets of polymeric material.

4. The process of claim 3 wherein the polymeric material from which said sheets and said bead of polymeric material are formed is polyethylene, and wherein the step of applying at least one stream of hot polymeric material comprises heating the polymeric material to a temperature of between about 260° and about 340°C.

5. The process of claim 4 wherein said polymeric material is heated to a temperature of between about 320° and about 340°C.

6. The process of claim 4 wherein said second sheet of polymeric material is a film of black branched polyethylene.

7. The process of claim 6 wherein the step of applying at least one stream of hot polymeric material is accomplished by applying at least 35 mg/cm. of branched polyethylene in a ribbon less than about 0.8 cm. wide.

8. The process of claim 6 wherein the step of applying at least one stream of hot polymeric material is accomplished by applying at least 50 mg/cm. of black pigmented branched polyethylene in a ribbon less than about 0.8 cm. wide.

9. The process of claim 4 wherein said second sheet of polymeric material is a sheet of fibrous, non-woven non-woven polymeric material.

10. The process of claim 9 wherein said first and second sheets of non-woven polymeric material have a basis weight of at least 1.2 oz. per sq. yd.

11. The process of claim 10 wherein the step of applying at least one stream of hot polymeric material is accomplished by applying at least 35 mg/cm. of branched polyethylene in a ribbon less than about 0.8 cm. wide.

12. The process of claim 10 wherein the step of applying at least one stream of hot polymeric material is accomplished by applying at least 50 mg/cm. of black pigmented branched polyethylene in a ribbon less than about 0.8 cm. wide.

13. The process of claim 3 wherein the step of applying at least one stream of hot polymeric material comprises applying a plurality of parallel streams of hot polymeric material and wherein the process further comprises the step of slitting the composite sheet to form a plurality of tubes from said first and second sheets of polymeric material.

14. The process of claim 3 wherein the step of applying at least one stream of hot polymeric material comprises applying a plurality of parallel streams of hot polymeric material, and wherein the process further comprises the step of slitting each bead, along its longitudinal axis, to form a plurality of tubes from said first and second sheets of polymeric material.

* * * * *